US 9,192,953 B2

(12) United States Patent
Hendricks, Sr.

(10) Patent No.: US 9,192,953 B2
(45) Date of Patent: Nov. 24, 2015

(54) PRECISION FLUID DELIVERY SYSTEM

(71) Applicant: Todd E. Hendricks, Sr., Alvordton, OH (US)

(72) Inventor: Todd E. Hendricks, Sr., Alvordton, OH (US)

(73) Assignee: Pioneer Industrial Systems, LLC, Alvordton, OH (US)

( * ) Notice: Subject to any disclaimer, the term of this patent is extended or adjusted under 35 U.S.C. 154(b) by 84 days.

(21) Appl. No.: 14/096,315

(22) Filed: Dec. 4, 2013

(65) Prior Publication Data

US 2015/0151314 A1 Jun. 4, 2015

(51) Int. Cl.
| | |
|---|---|
| *B05B 15/12* | (2006.01) |
| *B05C 11/10* | (2006.01) |
| *B05B 9/04* | (2006.01) |
| *B29D 30/00* | (2006.01) |
| *F04B 43/12* | (2006.01) |
| *F04B 49/06* | (2006.01) |
| *F04B 43/09* | (2006.01) |

(52) U.S. Cl.
CPC ............. *B05B 9/042* (2013.01); *B05B 15/12* (2013.01); *B29D 30/0005* (2013.01); *F04B 43/09* (2013.01); *F04B 43/12* (2013.01); *F04B 43/1261* (2013.01); *F04B 49/06* (2013.01); *F04B 49/065* (2013.01)

(58) Field of Classification Search
USPC ......... 118/683, 684, 692, 693, 694, 712, 713, 118/326, 309, 634, 50, DIG. 7; 427/424
See application file for complete search history.

(56) References Cited

U.S. PATENT DOCUMENTS

| | | | |
|---|---|---|---|
| 3,507,247 A | 4/1970 | Kwierant | |
| 3,813,042 A | 5/1974 | Szczepanski | |
| 3,822,948 A * | 7/1974 | Handl | 401/146 |
| 4,125,639 A | 11/1978 | Brandl | |
| 4,728,274 A | 3/1988 | Siegenthaler | |
| 4,778,060 A | 10/1988 | Wessner, Jr. | |
| 5,153,034 A | 10/1992 | Telchuk et al. | |
| 5,188,904 A | 2/1993 | Graves | |
| 5,268,580 A | 12/1993 | He | |
| 5,309,931 A * | 5/1994 | Meyer, III | 134/57 R |
| 5,397,394 A | 3/1995 | Orr | |
| 5,429,682 A | 7/1995 | Harlow, Jr. et al. | |
| 5,562,773 A * | 10/1996 | Church | 118/321 |
| 5,631,028 A | 5/1997 | Mizokawa et al. | |
| 5,895,762 A * | 4/1999 | Greenfield et al. | 436/43 |
| 6,077,469 A | 6/2000 | Golightly et al. | |
| 6,393,338 B1 * | 5/2002 | Kemnitz | 700/231 |
| 6,939,404 B1 * | 9/2005 | Davis et al. | 118/207 |
| 6,946,032 B2 | 9/2005 | Pohl et al. | |
| 7,399,362 B2 | 7/2008 | Pohl et al. | |
| 7,943,201 B2 | 5/2011 | Hendricks, Sr. | |

(Continued)

FOREIGN PATENT DOCUMENTS

| | | |
|---|---|---|
| JP | 11129343 A | 5/1999 |
| KR | 20040018978 A | 3/2004 |

*Primary Examiner* — Yewebdar Tadesse
(74) *Attorney, Agent, or Firm* — Fraser Clemens Martin & Miller LLC; William J. Clemens (57) ABSTRACT

A precision fluid delivery system includes a peristaltic pump, a motor, and a controller. The peristaltic pump has a fluid inlet for communication with a fluid source and a fluid outlet for communication with a tire spraying system. The motor is coupled to and configured to drive the peristaltic pump. The controller is in communication with the motor, and operates the peristaltic pump for delivery of the fluid to a tire spraying system during a tire coating operation.

17 Claims, 4 Drawing Sheets

(56) References Cited

U.S. PATENT DOCUMENTS

| | | |
|---|---|---|
| 8,397,662 B2 | 3/2013 | Herre et al. |
| 2002/0023585 A1 | 2/2002 | Sashihara |
| 2003/0136338 A1 | 7/2003 | Pohl et al. |
| 2004/0023612 A1 | 2/2004 | Kriesel |
| 2004/0047995 A1 | 3/2004 | Krueger |
| 2004/0148796 A1 | 8/2004 | Morrison |
| 2005/0068774 A1 | 3/2005 | Pippa et al. |
| 2005/0184016 A1 | 8/2005 | Silverman |
| 2005/0247263 A1 | 11/2005 | Pohl et al. |
| 2006/0164825 A1 | 7/2006 | Pippa et al. |
| 2006/0292308 A1 | 12/2006 | Clifford et al. |
| 2007/0056510 A1 | 3/2007 | Antaya |
| 2007/0166463 A1 | 7/2007 | Kelly |
| 2007/0281100 A1 | 12/2007 | Herre et al. |
| 2007/0283685 A1* | 12/2007 | Ripper et al. .......... 60/288 |
| 2008/0047973 A1* | 2/2008 | Elsom et al. .......... 222/57 |
| 2009/0061099 A1* | 3/2009 | Hendricks, Sr. .......... 427/424 |
| 2012/0219428 A1* | 8/2012 | Cantolino et al. .......... 417/12 |
| 2012/0325142 A1 | 12/2012 | Takahashi |
| 2013/0039778 A1* | 2/2013 | Blackson et al. .......... 417/44.1 |
| 2013/0074362 A1 | 3/2013 | Lesicka |
| 2013/0078385 A1 | 3/2013 | Hendricks, Sr. |

* cited by examiner

PRECISION FLUID DELIVERY SYSTEM

FIELD OF THE INVENTION

This invention relates to a system for coating green or uncured tires and, more particularly, to a fluid delivery system for spraying a coating on predetermined areas both inside and outside green tires.

BACKGROUND OF THE INVENTION

Pneumatic rubber tires are conventionally produced by molding and curing an uncured or green tire in a molding press, in which the green tire is pressed outwardly against a mold surface by means of an inner fluid expandable bladder. By this method, the green tire is shaped against the mold surface to define the tire's tread pattern and configuration of sidewalls. By application of heat, the tire is cured. Generally, the bladder is expanded by internal pressure provided by a fluid such as hot gas, hot water and/or steam which also participates in the transfer of heat for curing or vulcanization purposes. The tire is then usually allowed to cool in the mold, sometimes aided by added cold or cooler water to the internal surface of the bladder. The mold is then opened, the bladder collapsed by removal of its internal fluid pressure, and the tire removed from the tire mold. Such tire curing procedure is well known to those having skill in the art.

The use of synthetic rubber compounds in the manufacture of tires makes it necessary to apply suitable coatings to the rubber surfaces of the fabricated tire carcasses. The coatings ensure proper distribution of rubber during the curing operation and the production of finished tires with unblemished surfaces. The coatings are generally liquid in form, and are known as lubricants where applied to the interior surface of a green tire, and as anti-blemish paints where applied to the outer surface at the sidewall areas of the green tire.

The outside green tire paints allow the rubber to slip as it comes in contact with the metal mold, and the paints also serve as a release agent when the tire must separate from the mold at the end of the vulcanization cycle. Another function of the paint is to provide bleeding of air, which becomes trapped between the tire and the mold. Outside green tire paints also aid in the appearance of the finished tire.

Care must be taken that certain areas of the green tire are not coated, and that the lubricant employed at the interior of the carcass does not reach any exterior surface of the carcass. Also, applying the coatings manually by either spraying or brushing is time consuming and laborious. Automatic applications, are well known in the art, however, these prior art applications require presorting and separate applicators for tire size differences and outer spraying.

A known robotic tire spraying system is described in U.S. Pat. No. 7,943,201 to Hendricks, Sr., the entire disclosure of which is hereby incorporated herein by reference. The system analyzes individual green tires using an integrated vision system. The system controls the robotic spray position, the fan, fluid, atomizing air, and tire rotation speed for optimal spray coverage on both the inside and outside of green tires. The system includes a conveyor, an overhead mounted camera located over an infeed station, and a second camera located perpendicular to the green tire's tread and several feet away from the center of the tire. Pictures of the green tire in the station are used to estimate the center and radius of the tire and locate the angle of the bar code with respect to the center of the tire. Reference points are provided from the camera images and robot positions are calculated to control the spraying.

Another robotic tire spraying system is described in U.S. Patent Application Publication No. 2013/0078385. also to Hendricks, Sr. The system includes a downdraft spray booth for receiving a tire. A fluid delivery system is disposed in the spray booth, and includes at least one spray gun for delivering a coating to the tire. A robot transports the tire to the spray booth. Each of the spray booth, the fluid delivery system, and the robot are disposed on a platform, for convenient transport and installation of the system.

There is a continuing need for a precision fluid delivery system that minimizes overspray and provides uniform coverage of tires in tire spraying systems. Desirably, the precision fluid delivery system can be used to retrofit existing robotic tire spraying systems, and permits a fine adjustment of the tire spraying conditions in operation.

SUMMARY OF THE INVENTION

In concordance with the instant disclosure, a precision fluid delivery system that minimizes overspray and provides uniform coverage of tires in tire spraying systems, which can be used to retrofit existing tire spraying systems, and which permits a fine adjustment of the tire spraying conditions in operation, has surprisingly been discovered.

In one embodiment, a precision fluid delivery system includes a peristaltic pump, a motor, and a controller. The peristaltic pump has a fluid inlet for communication with a fluid source, and a fluid outlet for communication with a tire spraying system. The motor is coupled to and configured to drive the peristaltic pump. The controller is in communication with the motor. The controller provides a fine control of the peristaltic pump for delivery of the fluid to the tire spraying system.

In another embodiment, a tire spraying system includes a spray booth for receiving a tire, at least one spray gun for delivering a coating of a fluid to a tire, and the precision fluid delivery system. The fluid outlet of the peristaltic pump is in fluid communication with the at least one spray gun of the tire spraying system.

In a further embodiment, a method for retrofitting a tire spraying system includes providing the tire spraying system and a precision fluid delivery system. The fluid inlet of the precision fluid delivery system is then placed in fluid communication with the fluid source, and the fluid outlet of the precision fluid delivery system is placed in fluid communication with the at least one spray gun. The tire spraying system is thereby retrofitted for precision delivery of fluid in a tire spraying operation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
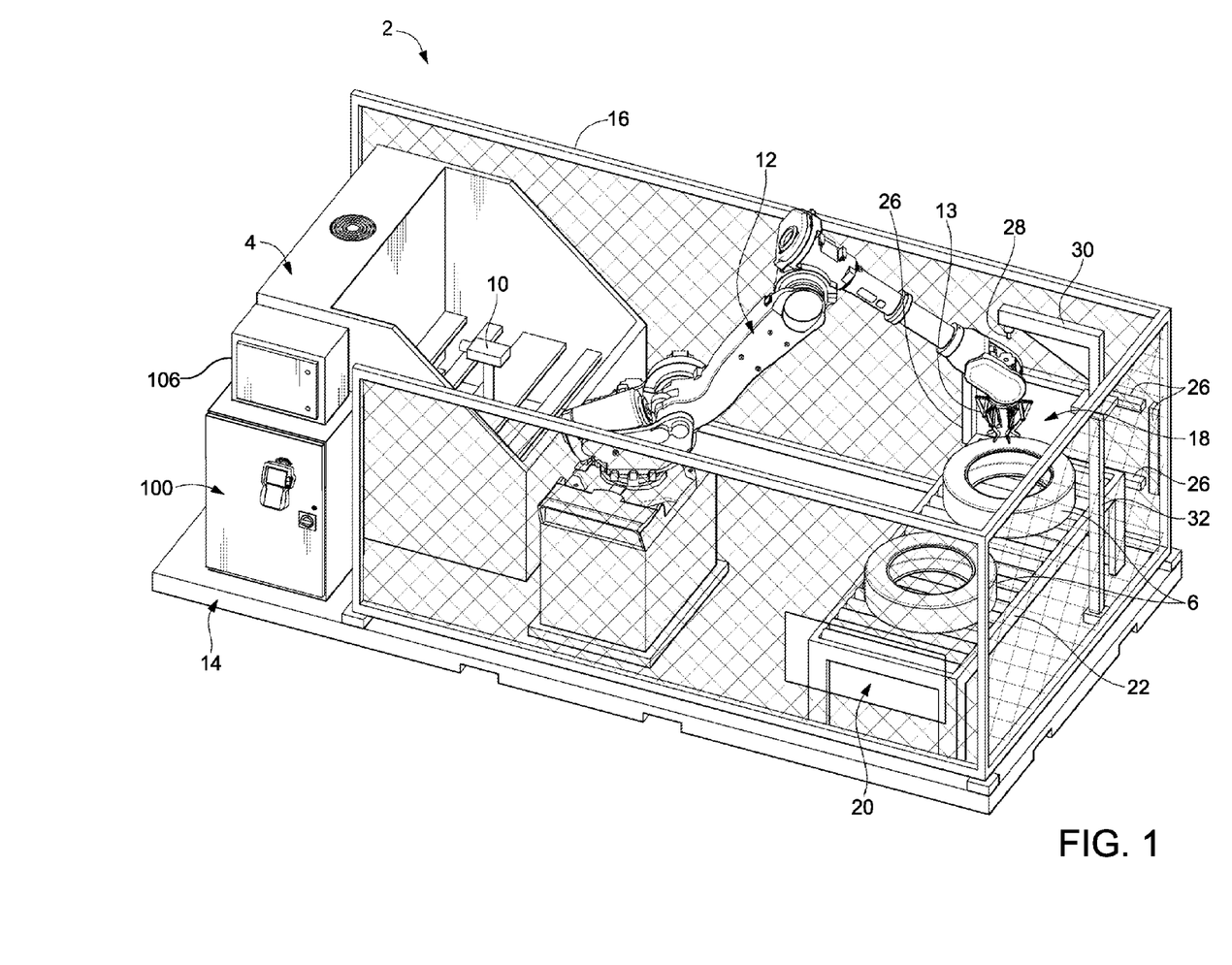
FIG. 1 is a perspective view of a tire spraying system having a precision fluid delivery system according to one embodiment of the present disclosure.

FIG. 1 shows an exemplary tire spraying system 2. The tire spraying system 2 has a precision fluid delivery system 100 according to the present disclosure, and as further shown in FIGS. 2-4. Although the precision fluid delivery system 100 illustrated in FIG. 1 is a modular- or platform-type tire spraying system 2, it should be understood that the precision fluid delivery system 100 may also be used with other types of tire spraying systems 2, as desired. Advantageously, the precision fluid delivery system 100 of the present disclosure may be used to retrofit existing tire spraying systems 2, and to facilitate a fine control of tire spraying in the tire manufacturing process.

Figure 2:
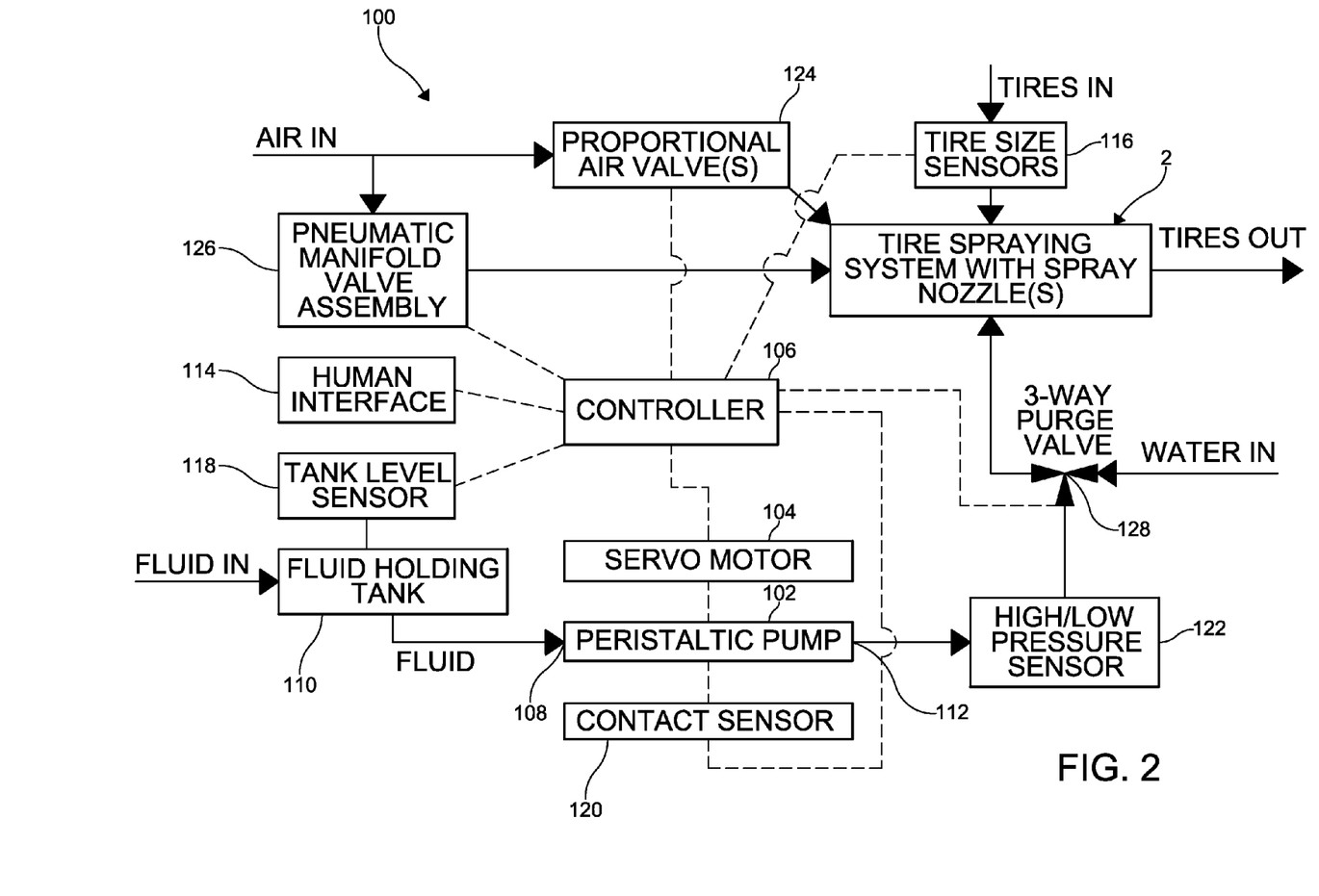
FIG. 2 is a schematic diagram of the tire system having the precision fluid delivery system shown in FIG. 1.
Figure 3:
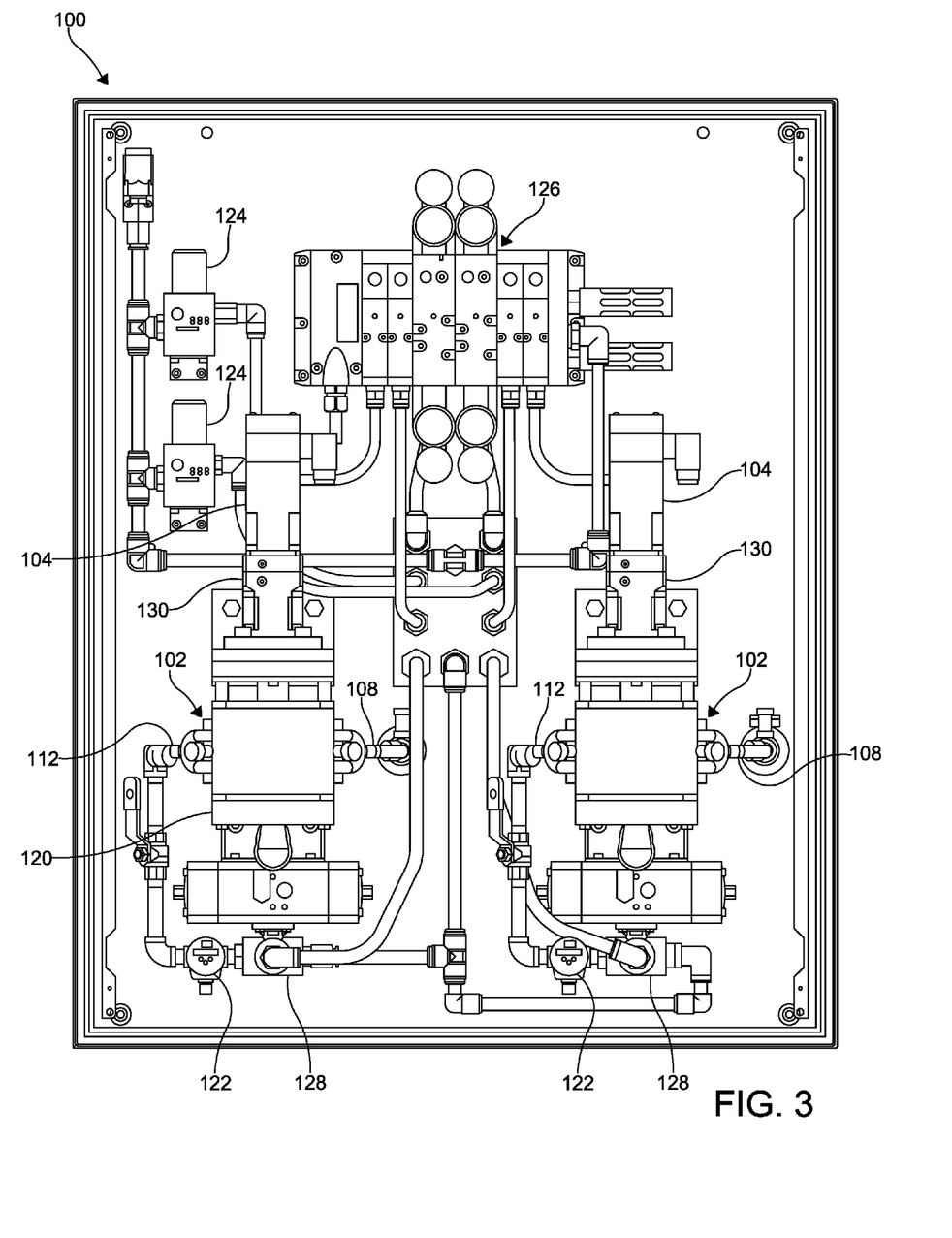
FIG. 3 is a front elevational view of the precision fluid delivery system shown in FIG. 1, and further illustrated with a front cover removed.
Figure 4:
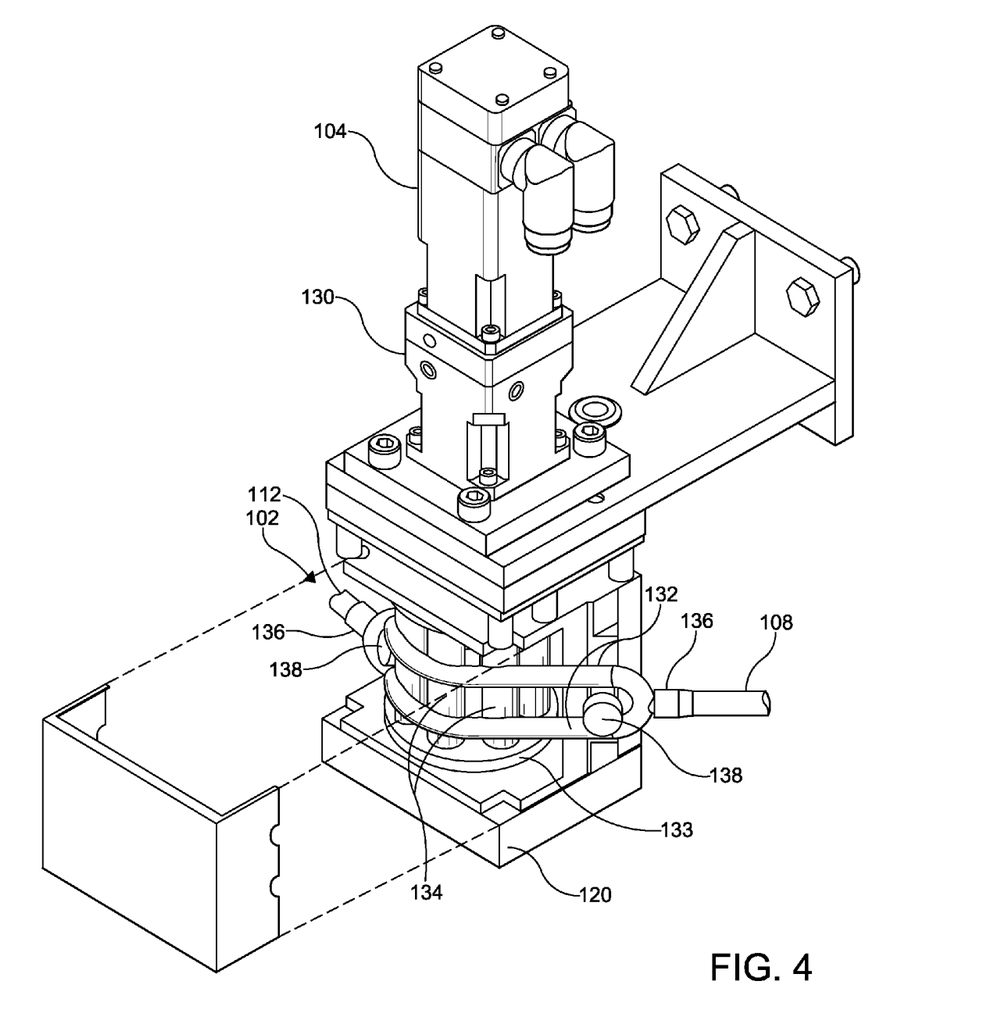
FIG. 4 is a partially exploded, enlarged perspective view of a peristaltic pump of the precision fluid delivery system depicted in FIG. 3.

In addition to the precision fluid delivery system 100, which is further shown in FIGS. 2-4, the tire spraying system 2 may include a spray booth 4 for receiving a tire 6, at least one spray gun 10, and a robot 12. The spray booth 4 may be a down draft spray booth, for example. A skilled artisan may also select other suitable types of spray booths 4, as desired. The tire 6 shown in FIG. 1 is a green or uncured tire that requires coating prior to a molding or curing operation to manufacture a final tire product (not shown).

Although the spray gun 10 shown in FIG. 1 is a unidirectional and fixed-position, it should be appreciated that the spray gun 10 may alternatively be mobile, for example, attached to a spraying robot (not shown). Similarly, although the spray gun 10 may be being disposed inside the tire 6 for coating an inside of the tire 6, when the tire 6 is positioned within the spray booth 4, a disposition of the spray gun 10 adjacent an outer wall of the spray booth 4 may be employed to coat an outside of the tire 6, as desired.

The robot 12 of the tire spraying system 2 is configured to selectively transport the tire 6 to and from the spray booth 4. As shown in FIG. 1, the robot 12 may be multi-axis machine. Nonlimiting but suitable examples of the robot 12 may include one of a 4-, 5-, and 6-axis robot. The robot 12 has a gripper 13 that allows the robot 12 to selectively pick up the tire 6. The gripper 13 may also be rotatable, and facilitate a rotation of the tire 6 by the robot 12 during a coating operation. The positioning of the tire 6 and the rate of rotation of the tire 6 may be finely controlled by the robot 12. In particular embodiments, the robot 12 is the only component of the tire spraying system 2 responsible for moving the tire 6 during the spraying operation. The use of other types or robots and related machines for moving the tire 6 is also within the scope of the present disclosure.

The tire spraying system 2 of the present disclosure may also include a platform 14 for transport of the tire spraying system 2. For example, each of the spray booth 4, the fluid delivery system 8, and the robot 12 may be disposed on the platform 14. In a particular embodiment, the platform 14 is a portable skid configured to be moved by a skid loader or like equipment. The platform 14 permits a convenient transport and rapid installation of the tire spraying system 2 at a facility where tires 6 are to be painted.

A safety fence 16 may also be disposed around at least a portion of the platform 14, including at least one of the spray booth 4, the fluid delivery system 100, and the robot 12, as desired. In certain embodiments, the safety fence 16 is disposed around at least a portion of a perimeter of the platform 14. In an illustrative embodiment, the safety fence 16 includes an entry gate 18 and an exit gate 20. The tire 6 is transported to the tire spraying system 2, prior to spraying, through the entry gate 18. Following spraying, the tire 6 is transported from the tire spraying system 2 through the exit gate 20.

The transportation of the tire 6 through the tire spraying system 2 may be performed with conveying equipment such as a conveyor 22. The conveyor 22 may include at least one of a powered belt conveyor and a non-powered roller conveyor, for example. In particular, the conveyor 22 is disposed between the entry gate 18 and the exit gate 20, and further disposed on the platform 14, for disposition of the tire 6 adjacent the robot 12 for the spraying operation. It should be appreciated that the tire 6 may be manually loaded onto the conveyor 22 of the tire spraying system 2, through the entry gate 18. Additional conveyors, belts, and other transportation systems outside of the tire spraying system 2 may be employed to deliver and retrieve the tire 6 from the conveyor 22 of tire spraying system 2, as desired.

With renewed reference to FIGS. 2-4, the precision fluid delivery system 100 of the tire spraying system 2 is shown in further detail. The precision fluid delivery system 100 includes a peristaltic pump 102, a motor 104, and a controller 106. The peristaltic pump 102 has a fluid inlet 108 for communication with a fluid source 110, and a fluid outlet 112 for communication with the tire spraying system 2.

The motor 104 is coupled to, and configured to drive, the peristaltic pump 102. In particular embodiments, the motor 104 is a servo motor, which permits a precision control of the peristaltic pump 102. In other embodiments, the motor 104 is may be a fixed speed, stepper, or variable speed electric motor. Pneumatic and hydraulic motors may also be used to the drive the peristaltic pump, as desired. One of ordinary skill in the art may select any suitable type of the motor 104 within the scope of the present disclosure.

The controller 106 is in communication with the motor 104. The controller 106 is configured to operate the peristaltic pump 102 for delivery of fluid from the fluid source 110 to the tire spraying system 2.

The controller may include a processor and a memory. The memory may include a tangible, non-transitory computer-readable storage medium on instructions are embodied for execution by the processor. The controller 106 may be used to calculate spray parameters for each individual tire 6, for example, based upon measurements, barcode readings, and the like. In particular, the tire position relative to the spray gun, fan width, atomizing air, rotation speed, and spray volume may be calculated by the controller 106 on a per-tire basis.

In certain embodiments, the controller 106 may also be used for operating at least one of the robot 12 and the at least one spray gun 10 when spraying the tire 6. The controller 106 may further have a human interface or terminal 114 that permits an establishment of settings or manual operation of the precision fluid delivery system 100. The controller 106 may be disposed on the platform 14, or may be disposed a separate location apart from the platform 14, as desired.

The controller 106 may also be in communication with at least one sensor. For example, the at least one sensor may include a tire size sensor 116 for measuring the dimensions of the tire 6 prior to a spraying of the tire 6 in the tire spraying system 2. As shown in FIG. 1, the tire size sensor 116 may be in the form of a light array system 26 for measuring the dimensions of the tire 6 prior to spraying the tire 6 with the coating 11. The light array system 26 may include at least one light emitter and at least one light receiver. The light array system 26 may be disposed on the safety fence 16, for example, adjacent the entry gate 18 formed in the safety fence 16. The light array system 26 may further include a vertical light emitter and a vertical light receiver, and a horizontal light emitter and a horizontal light receiver. The light array system 26 may be employed to measure at least one of an inner diameter, an outer diameter, and a profile of the tire 6 delivered through the entry gate 18. The measurement data from the light array system 26 is then sent to the controller 106, which uses the measurement data in calculating the spray parameters, for example, a fan width, and controlling the at least one of the spray gun 10 and the robot 12 accordingly.

In another example, the tire size sensor 116 in communication with the controller 106 is a camera 28. The camera 28 may be used to generate an image of the tire 6, which is delivered to the controller 106 for calculating the spray parameters. The camera 28 may be disposed to a side of the tire 6 or overhead of the tire 6, as desired. As with the measurements obtained by the light array system 26, the image generated by the camera 28 may be used by the controller 106 in operating the at least one spray gun 10 and the robot 12 of the tire spraying system 2.

As shown in FIG. 1, the camera 28 may be disposed on an arm 30. The arm 30 normally extends upwardly from the tire spraying system 2 and over top of the tire 6 when loaded into the tire spraying system 2. The arm 30 permits a generating of the image of the tire 6 from above the tire 6, as the tire 6 enters the tire spraying system 2. As a nonlimiting example, the arm 30 may be substantially L-shaped, although other suitable shapes for the arm 30 may also be used.

Advantageously, the arm 30 may be collapsed, for example, telescopically or at a hinge point, or removed, for example, by pulling a pin (not shown) connecting the arm 30 to a lower support 32 mounted on the platform 14, in order that the tire spraying system 2 may be readied for transport. Although the camera 28 is shown being the only sensor attached to the arm 30, it should be understood that the light arrays 26, or other tire size sensors 116 such as barcode readers, radio-frequency identification scanners, and the like, may also be attached to the arm 30 within the scope of the present disclosure.

With renewed reference to FIG. 2, where the fluid source 110 is a fluid holding tank, the at least one sensor in communication with the controller 106 may include a tank level sensor 118. The tank level sensor 118 is in communication with the fluid holding tank and the controller 106, and configured to detect a level of the fluid within the fluid holding tank.

Upon sensing that the level of the fluid within the fluid holding tank has reached a predetermined threshold, the controller 106 may be configured to shut down an operation of the peristaltic pump 102 until the fluid in the fluid holding tank is replenished. The controller 106 may likewise notify an operator of the precision fluid delivery system 100, for example, using the terminal 114, that the fluid holding tank 110 needs to be replenished.

The at least one sensor in communication with the controller 106 may further include a contact sensor 120. The contact sensor 120 is in fluid communication with the peristaltic pump 102, and configured to detect a presence of a leaked fluid from the peristaltic pump 102. Any suitable means for detecting the presence of the leaked fluid, including electrical-resistance based sensors, may be used within the scope of the present disclosure.

For example, as shown in FIGS. 3-4, the contact sensor 120 may be disposed beneath the peristaltic pump 102 where any leaked fluid will naturally flow from the peristaltic pump 102. The controller 106 may be configured to shut down the motor 104 upon the detection of the presence of the leaked fluid from the peristaltic pump 102.

The controller 106 may also be in communication with a pressure sensor 122. The pressure sensor 122 may be in fluid communication with, and disposed between, the peristaltic pump 102 and the tire spraying system 2, for example. The pressure sensor 122 is configured to detect whether a pressure of the fluid from the peristaltic pump 102 meets a predetermined threshold. In a particular embodiment, the pressure sensor 122 is a high/low pressure sensor that is configured to detect whether the pressure of the fluid from the peristaltic pump 102 exceeds a predetermined upper threshold or drops below a predetermined lower threshold.

It should be appreciated that, where the pressure exceeds a predetermined upper threshold, a blockage downstream from the pressure sensor 122, for example, a blockage at the spray gun 10, may have occurred. A skilled artisan should also appreciate that, where the pressure drops below the predetermined threshold, a leakage or other malfunction upstream from the pressure sensor 122 may have occurred. In such instances, the controller 106 is configured to shut down the motor 104 upon the detection of the pressure of the fluid from the peristaltic pump 102 meeting the predetermined threshold.

As shown in FIGS. 2-3, the precision fluid delivery system 100 of the present disclosure includes at least one proportional air valve 124. The at least one proportional air valve 124 allows volumes of air to be introduced to the fluid selectively and precisely at a multitude of different pressures. It should be understood that a fan size of the fluid expelled from the spray gun 10 may be precisely controlled though use of the at least one proportional air valve 124.

The at least one proportional air valve 124 has an air inlet in communication with an air source, for example, an air compressor or a high pressure air tank, and an air outlet in communication with the spray gun 10 of the tire spraying system. The at least one proportional air valve 124 is in communication with the controller 106, which is configured to regulate the at least one proportional air valve 124 and a delivery of the air to control the fan size of the fluid as it is expelled from the spray gun 10.

The calculations employed by the controller 106 to regulate the fan size may take into account parameters such as fluid viscosity, solids, pH, and other suitable variables. These parameters may be input by the operator of the precision fluid delivery system 100 using the terminal 114, for example. In another example, these parameters are monitored in real time by the controller 106 using the at least one sensor of the precision fluid delivery system 100.

The precision fluid delivery system 100 also includes a pneumatic manifold assembly 126. The pneumatic manifold assembly 126 has an air inlet in communication with the air source, and an air outlet for communication with a pneumatic actuator of the tire spraying system 2. The pneumatic actuator may be any actuator used within the tire spraying system 2 for movement of a part, for example, the tire spray gun 10. The pneumatic manifold assembly 126 is in communication with the controller 106. It should be appreciated that the controller 106 may also be configured to regulate an actuation of the pneumatic actuator of the tire spraying system 2.

In certain embodiments, as shown in FIGS. 2-3, the precision fluid delivery system 100 further includes a three-way purge valve 128. The purge valve 128 is in fluid communication with, and disposed between, the pressure sensor 122 and the tire spraying system 2. The three-way purge valve 128 is also in fluid communication with a water source. The controller 106 is in communication with the three-way purge valve 128 and configured to selectively clean the tire spraying system 2 during a purge operation, for example, by directing a flow of water or a cleaning solution to the tire spraying system 2 instead of the fluid for spraying on tires. The spray gun 10 of the tire spraying system 2 may thereby be cleaned following a tire spraying operation.

Referring now to FIGS. 3-4, the peristaltic pump 102 of the present disclosure is further described. The peristaltic pump 102 may be connected to the motor 104 with an adapter 130, which is configured to rotate the peristaltic pump 102 in response to actuation by the motor 104, for example. In other embodiments, the motor 104 is directly connected to the peristaltic pump 102 for rotation of the same.

The peristaltic pump 102 is a positive displacement pump having at least one flexible tube 132 that is disposed on a rotor 133. The rotor 133 has a plurality of rollers 134. The fluid is contained within a flexible tube 132, and the rollers 134 of the rotor 133 compress the flexible tube 132 as the rotor 133 turns. In operation, the part of the flexible tube 132 under compression is pinched closed or "occludes", thereby forcing the fluid to be pumped to move through the flexible tube 132. Additionally, as the flexible tube 132 opens to its natural state after the passing of the rollers 134, fluid flow is induced to the pump. The fluid for tire spraying is thereby pumped through the at least one flexible tube 132 as the rotor 133 is rotated by the motor 104.

In the peristaltic pump 102 shown in FIGS. 3-4, the at least one flexible tube 132 includes a pair of the flexible tubes 132. The pair of flexible tubes 132 are both disposed on the rollers 134, and are connected at opposing ends with a pair of Y-tubes 136. The Y-tubes 136 are held in place by a pair of protuberances 138 extending outwardly from a housing of the peristaltic pump 102, and which operate to hold the flexible tubes 132 taut against the rollers 134. The Y-tubes 136 are each in communication with one of the fluid inlet 108 and the fluid outlet 112 of the peristaltic pump 102.

It should be appreciated that the precision fluid delivery system 100 may include a pair of the peristaltic pumps 102 and a pair of the proportional air valves 124, for example, as shown in FIG. 3. The pair of peristaltic pumps 102 and the pair of proportional air valves 124 may operate in parallel to supply fluid and air to more than one spray gun 10, for example, an outside tire spray gun 10 and an inside tire spray gun 10. In other instances, the pair of peristaltic pumps 102 and the pair of proportional air valves 124 may be configured to operate with one as a primary unit and the other as a backup unit, in order to minimize a downtime of the precision fluid delivery system 100 in operation. One of ordinary skill in the art understands that more than two of the peristaltic pumps 102 and the proportional air valves 124 may also be used, as desired.

Advantageously, the precision fluid delivery system 100 for the robotic tire spraying system 2 of the present disclosure minimizes overspray and provides uniform coverage of tires. Furthermore, conventional spraying systems can be readily retrofitted with the precision fluid delivery system 100, to permit a fine adjustment of the tire spraying conditions in operation.

While certain representative embodiments and details have been shown for purposes of illustrating the invention, it will be apparent to those skilled in the art that various changes may be made without departing from the scope of the invention, which is further described in the following appended claims.

What is claimed is:

1. A precision fluid delivery system, comprising:
   a peristaltic pump having a fluid inlet for communication with a fluid source and a fluid outlet for communication with a tire spraying system;
   a motor coupled to and configured to drive the peristaltic pump;
   a controller in communication with the motor, the controller is configured to provide a fine control of the peristaltic pump for delivery of fluid from the fluid source to the tire spraying system;
   a pressure sensor in fluid communication with and disposed between the peristaltic pump and the tire spraying system and configured to detect whether a pressure of the fluid from the peristaltic pump meets a predetermined threshold; and
   a three-way purge valve in fluid communication with and disposed between the pressure sensor and the tire spraying system, the three-way purge valve also in fluid communication with a water source.

2. The precision fluid delivery system of claim 1, wherein the fluid source is a fluid holding tank.

3. The precision fluid delivery system of claim 2, further comprising a tank level sensor in communication with the fluid holding tank and the controller.

4. The precision fluid delivery system of claim 1, wherein the peristaltic pump includes at least one flexible tube disposed on a plurality of rollers, the fluid for tire spraying pumped through the at least one flexible tube as the rollers rotate.

5. The precision fluid delivery system of claim 4, wherein the at least one flexible tube includes a Y-tube.

6. The precision fluid delivery system of claim 1, wherein the motor is a servo motor.

7. The precision fluid delivery system of claim 6, wherein the servo motor is coupled to the peristaltic pump with an adapter.

8. The precision fluid delivery system of claim 1, further comprising a contact sensor in fluid communication with the peristaltic pump and configured to detect a presence of a leaked fluid from the peristaltic pump.

9. The precision fluid delivery system of claim 8, wherein the contact sensor is in communication with the controller, the controller configured to shut down the motor upon the detection of the presence of the leaked fluid from the peristaltic pump.

10. The precision fluid delivery system of claim 1, wherein the pressure sensor is in communication with the controller, the controller configured to shut down the motor upon the detection of the pressure of the fluid from the peristaltic pump meeting the predetermined threshold.

11. The precision fluid delivery system of claim 1, where the three-way purge valve is in communication with the controller, the controller configured to selectively clean the tire spraying system during a purge operation.

12. The precision fluid delivery system of claim 1, further comprising at least one proportional air valve having an air inlet for communication with an air source and an air outlet for communication with a spray gun of the tire spraying system.

13. The precision fluid delivery system of claim 12, wherein the at least one proportional air valve is in communication with the controller, the controller configured to regulate a delivery of the air to the tire spraying system to control fan size from the spraying nozzle.

14. The precision fluid delivery system of claim 1, further comprising a pneumatic manifold assembly having an air inlet in communication with the air source and an air outlet for communication with a pneumatic actuator of the tire spraying system.

15. The precision fluid delivery system of claim 14, wherein the pneumatic manifold assembly is in communication with the controller, the controller configured to regulate an actuation of the pneumatic actuator of the tire spraying system.

16. A tire spraying system, comprising:

a spray booth for receiving a tire;

at least one spray gun for delivering a coating of a fluid to a tire; and a precision fluid delivery system including a peristaltic pump having a fluid inlet in communication with a fluid source and a fluid outlet in communication with the at least one spray gun, a motor coupled to and configured to drive the peristaltic pump, a controller in communication with the motor, the controller is configured to provide a fine control of the peristaltic pump for delivery of fluid from the fluid source to the at least one spray gun, a pressure sensor in fluid communication with and disposed between the peristaltic pump and the at least one spray gun and configured to detect whether a pressure of the fluid from the peristaltic pump meets a predetermined threshold, and a three-way purge valve in fluid communication with and disposed between the pressure sensor and the at least one spray gun, the three-way purge valve also in fluid communication with a water source.

17. The tire spraying system of claim 16, wherein the at least one spray gun is disposed within the spray booth.

* * * * *